(12) United States Patent
Sinha et al.

(10) Patent No.: US 12,393,847 B2
(45) Date of Patent: *Aug. 19, 2025

(54) GRADIENT ADVERSARIAL TRAINING OF NEURAL NETWORKS

(71) Applicant: Magic Leap, Inc., Plantation, FL (US)

(72) Inventors: Ayan Tuhinendu Sinha, San Francisco, CA (US); Andrew Rabinovich, San Francisco, CA (US); Zhao Chen, Mountain View, CA (US); Vijay Badrinarayanan, Mountain View, CA (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,377

(22) Filed: May 10, 2024

(65) Prior Publication Data
US 2024/0330691 A1     Oct. 3, 2024

Related U.S. Application Data

(63) Continuation of application No. 17/051,982, filed as application No. PCT/US2019/032486 on May 15, 2019, now Pat. No. 12,020,167.

(Continued)

(51) Int. Cl.
*G06N 3/08*     (2023.01)
*G06N 3/045*    (2023.01)
(Continued)

(52) U.S. Cl.
CPC ............. *G06N 3/088* (2013.01); *G06N 3/045* (2023.01); *G06N 3/084* (2013.01)

(58) Field of Classification Search
CPC ........ G06N 3/088; G06N 3/045; G06N 3/084; G06N 3/048; G06N 3/082; G06N 3/094
See application file for complete search history.

(56) References Cited

U.S. PATENT DOCUMENTS 6,850,221 B1     2/2005  Tickle
10,521,718 B1 *  12/2019 Szegedy ................ G06N 3/084
(Continued)

FOREIGN PATENT DOCUMENTS

WO     WO 2019222401 A2     11/2019

OTHER PUBLICATIONS

Ros, "Improving the Adversarial Robustness and Interpretability of Deep Neural Networks by Regularizing Their Input Gradients", The Thirty-Second AAAI Conference on Artificial Intelligence, Apr. 25, 2018. (Year: 2018).*

(Continued)

*Primary Examiner* — Dave Misir
(74) *Attorney, Agent, or Firm* — Seed Intellectual Property Law Group LLP

(57) ABSTRACT

Systems and methods for gradient adversarial training of a neural network are disclosed. In one aspect of gradient adversarial training, an auxiliary neural network can be trained to classify a gradient tensor that is evaluated during backpropagation in a main neural network that provides a desired task output. The main neural network can serve as an adversary to the auxiliary network in addition to a standard task-based training procedure. The auxiliary neural network can pass an adversarial gradient signal back to the main neural network, which can use this signal to regularize the weight tensors in the main neural network. Gradient adversarial training of the neural network can provide improved gradient tensors in the main network. Gradient adversarial techniques can be used to train multitask networks, knowl- (Continued)

edge distillation networks, and adversarial defense networks.

20 Claims, 8 Drawing Sheets

Related U.S. Application Data

(60) Provisional application No. 62/673,116, filed on May 17, 2018.

(51) Int. Cl.
*G06N 3/084* (2023.01)
*G06N 3/088* (2023.01)

(56) References Cited

U.S. PATENT DOCUMENTS

| | | |
|---|---|---|
| 2006/0028436 A1 | 2/2006 | Armstrong |
| 2007/0081123 A1 | 4/2007 | Lewis |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2017/0351952 A1 | 12/2017 | Zhang et al. |
| 2018/0012411 A1 | 1/2018 | Richey et al. |
| 2018/0137642 A1 | 5/2018 | Malisiewicz et al. |
| 2018/0268220 A1 | 9/2018 | Lee et al. |
| 2018/0268292 A1* | 9/2018 | Choi .................. G06V 10/454 |
| 2019/0130110 A1* | 5/2019 | Lee .......................... G06N 3/08 |
| 2019/0130275 A1 | 5/2019 | Chen et al. |

OTHER PUBLICATIONS

Andrychowicz et al, "Learning to Learn by Gradient Descent by Gradient Descent," arXiv:1606.04474v2 [cs.NE], Nov. 2016. (17 pages).
ARToolKit: htpps://web.archive.org/web/20051013062315/http://www.hitl.washington.edu:80/artoolkit/documentation/hardware.htm, archived Oct. 13, 2005.
Azuma, "A Survey of Augmented Reality," In Presence: Teleoperators and Virtual Environments 6(4):355-385, http://www.cs.unc.edu/~azuma, Aug. 1997.
Azuma, "Predictive Tracking for Augmented Reality," Dissertation, TR95-007, Doctor of Philosophy, Department of Computer Science, UNC-Chapel Hill, NC, Feb. 1995. (262 pages).
Bimber et al., "Spatial Augmented Reality-Merging Real and Virtual Worlds," 2005. (393 pages).
Chen et al., "GradNorm: Gradient Normalization for Adaptive Loss Balancing in Deep Multitask Networks," arXiv:1711.02257v1 [cs.CV], Nov. 2017.
Chollet, "Deep Learning with Python," Manning Publications, Version 6, pp. 1398-1410, 2017.
Drucker et al., "Double Backpropagation Increasing Generalization Performance," In *IJCNN-91—Seattle International Joint Conference on Neural Networks ii*, vol. 2: 145-150, Jul. 1991.
Ehmann et al., "Transferring Information Between Neural Networks," *IEEE International Conference on Acoustics, Speech And Signal Processing (ICASSP)*, Calgary, AB, Canada, Apr. 15-20, 2018, pp. 2361-2365.
Ganin et al., "Domain-Adversarial Training of Neural Networks," *Journal of Machine Learning Research* 17(2016): 1-35, Apr. 2016.
Gomes, "Convolutional Neural Networks," *Adversarial Attacks and Defenses for Convolutional Neural Networks*, Jan. 2018.
Goodfellow et al., "Advances in Neural Information Processing Systems 27," Curran Associates, Inc., via NIPS Generative Adversarial nets Paper, pp. 2672-2680, 2014.
Goodfellow et al., "Explaining and Harnessing Adversarial Examples," *International Conference on Learning Representations 2015*, arXiv:1412.6572v3 [stat.ML], Mar. 2015. (11 pages).
He et al., "Deep Residual Learning for Image Recognition," *2016 IEEE Conference on Computer Vision and Pattern Recognition, CVPR*, Las Vegas, NV, Jun. 27-30, 2016, pp. 770-778, arXiv:1512.03385v1 [cs.CV], Dec. 2015.
Huang et al., "Adversarial Attacks on Neural Network Policies," arXiv:1702.02284v1 [cs.LG], Feb. 2017. (10 pages).
International Preliminary Report on Patentability, dated Nov. 17, 2020, for International Application No. PCT/US19/32486. (5 pages).
International Search Report and Written Opinion, dated Nov. 13, 2019, for International Application No. PCT/US19/32486. (14 pages).
Jacob, "Eye Tracking in Advanced Interface Design," *Virtual Environments and Advanced Interface Design, ed.* by W Barfield and TA Furness, Oxford University Press, New York, Human-Computer Interaction Lab Naval Research Laboratory, Washington, D.C., 1995, pp. 258-288.
Jaderberg et al, "Decoupled Neural Interfaces using Synthetic Gradients," *Proceedings of the 34th International Conference on Machine Learning, ICML*, Sydney, NSW, Australia, Aug. 6-11, 2017, pp. 1627-1635.
Nøkland "Improving Back-Propagation by Adding an Adversarial Gradient," arXiv:1510.04189v2 [stat.ML], Apr. 2016. (8 pages).
Selvaraju et al., "Grad-CAM: Visual Explanations from Deep Networks via Gradient-based Localization," *IEEE International Conference on Computer Vision (ICCV)*, Venice, Italy, Oct. 22-29, 2017, pp. 618-626.
Sinha et al. "Gradient Adversarial Training of Neural Networks," arXiv:1806.08028v1 [cs.LG], Jun. 2018. (13 pages).
Srinivas et al., "Knowledge Transfer with Jacobian Matching," *Proceedings of the 35th International Conference on Machine Learning*, Stockholm, Sweden, PMLR 80, Mar. 2018. (Copyright 2018 by the authors).
Tanriverdi et al., "Interacting With Eye Movements in Virtual Environments," Department of Electrical Engineering and Computer Science, Tufts University, Medford, MA, *ACM CHI 2000 Human Factors in Computing Systems Conference*, The Hague, The Netherlands, Apr. 1-6, 2000, Association for Computing Machinery Press, pp. 265-272.

\* cited by examiner

GRADIENT ADVERSARIAL TRAINING OF NEURAL NETWORKS

CROSS-REFERENCE TO RELATED APPLICATIONS

This application is a continuation of U.S. patent application Ser. No. 17/051,982 filed Oct. 30, 2020, which is a 371 of International Patent Application Number PCT/2019/32486, filed May 15, 2019, which claims the benefit of priority to U.S. Patent Application No. 62/673,116, filed on May 17, 2018, entitled "Gradient Adversarial Training of Neural Networks," which is hereby incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Field

The present disclosure relates generally to systems and methods for machine learning and more particularly to systems and methods for training neural networks.

Description of the Related Art

A deep neural network (DNN) is a computation machine learning method. DNNs belong to a class of artificial neural networks (NN). With NNs, a computational graph is constructed which imitates the features of a biological neural network. The biological neural network includes features salient for computation and responsible for many of the capabilities of a biological system that may otherwise be difficult to capture through other methods. In some implementations, such networks are arranged into a sequential layered structure in which connections are unidirectional. For example, outputs of artificial neurons of a particular layer can be connected to inputs of artificial neurons of a subsequent layer. A DNN can be a NN with a large number of layers (e.g., 10s, 100s, or more layers).

Different NNs are different from one another in different perspectives. For example, the topologies or architectures (e.g., the number of layers and how the layers are interconnected) and the weights of different NNs can be different. A weight can be approximately analogous to the synaptic strength of a neural connection in a biological system. Weights affect the strength of effect propagated from one layer to another. The output of an artificial neuron can be a nonlinear function of the weighted sum of its inputs. The weights of a NN can be the weights that appear in these summations.

SUMMARY

Systems and methods for gradient adversarial training of a neural network are disclosed. In one aspect of gradient adversarial training, an auxiliary neural network can be trained to classify a gradient tensor that is evaluated during backpropagation in a main neural network that provides a desired task output. The main neural network can serve as an adversary to the auxiliary network in addition to a standard task-based training procedure. The auxiliary neural network can pass an adversarial gradient signal back to the main neural network, which can use this signal to regularize the weight tensors in the main neural network. Gradient adversarial training of the neural network can provide improved gradient tensors in the main network. Gradient adversarial training techniques can be used to train multitask networks, knowledge distillation networks, adversarial defense networks, or any other type of neural network. Gradient adversarial training techniques can be used to train neural networks for computer vision tasks and such training may be advantageous for augmented, mixed, or virtual reality systems.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

DETAILED DESCRIPTION

Overview

Figure 1A:
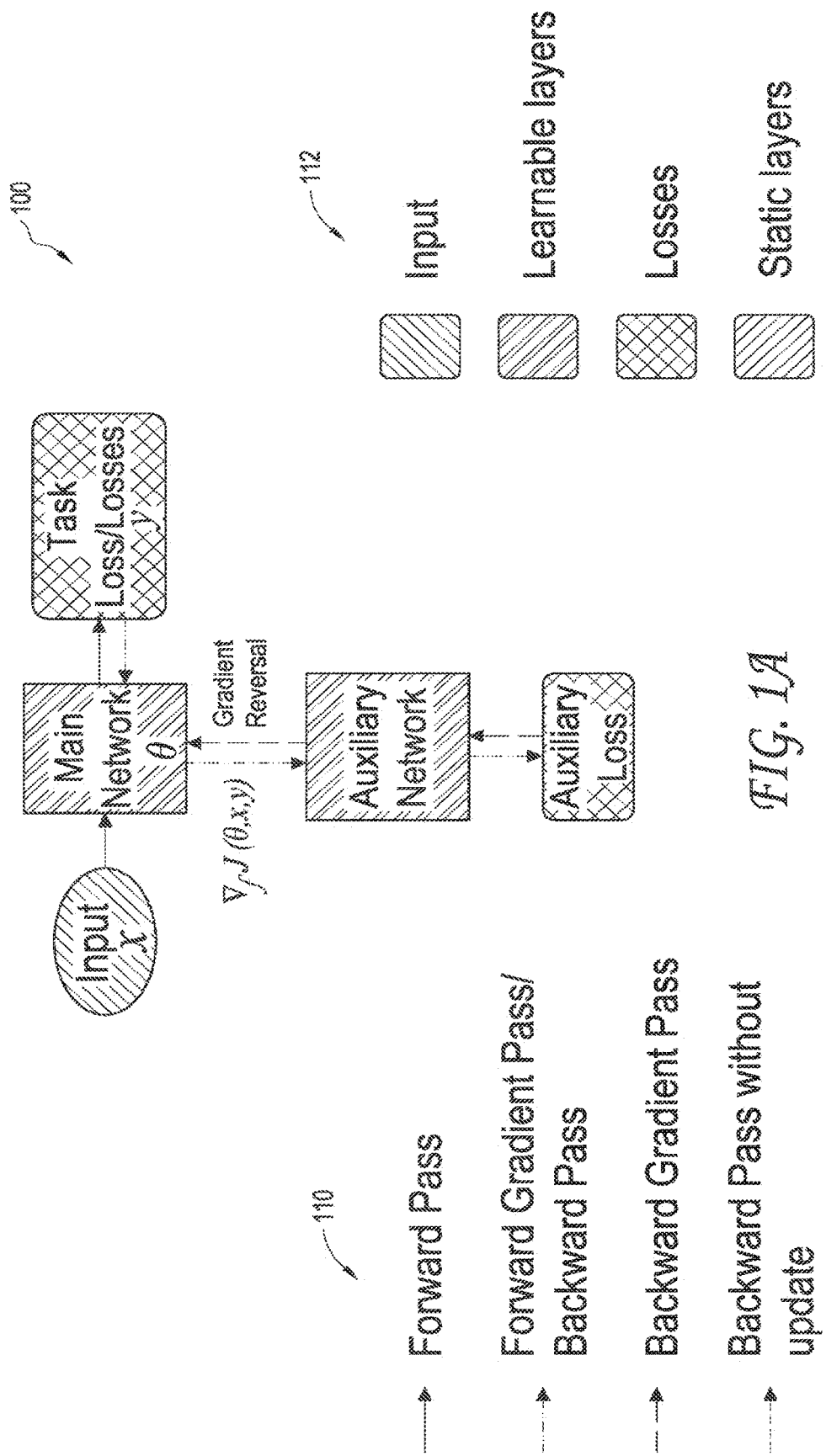
FIG. 1A is a block diagram that illustrates an example of the general methodology of gradient adversarial training (GREAT) wherein a main network is trained using standard backpropagation and also acts as an adversary to the auxiliary network via gradient reversal. The auxiliary network is trained on gradient tensors evaluated during backpropagation. Legends at the bottom left and right of FIG. 1A (also shown in FIGS. 1B-1D) show the different kinds of information flow (left legend 110) and the different kinds of modules in the networks (right legend 112).

Models representing data relationships and patterns, such as functions, algorithms, systems, and the like, may accept input, and produce output that corresponds to the input in some way. For example, a model may be implemented as a machine learning method such as a neural network (NN). Examples include a convolutional neural network (CNN) or a deep neural network (DNN). Deep learning is part of a broader family of machine learning methods based on the idea of learning data representations as opposed to task specific methods and shows a great deal of promise in solving audio-visual computational problems useful for augmented reality, mixed reality, virtual reality, and machine intelligence. In machine learning, a convolutional neural network (CNN, or ConvNet) can include a class of deep, feed-forward artificial neural networks, and CNNs have successfully been applied to analyzing visual imagery. Machine learning methods include a family of methods that can enable robust and accurate solutions to a wide variety of problems, including eye image segmentation, eye tracking, image classification, multitask learning, etc.

Deep multitask networks, in which one neural network produces multiple predictive outputs, can offer better speed and performance than their single-task counterparts but need to be trained properly. For example, a deep multitask network can be trained or taught to solve for multiple learning tasks at the same time, while exploiting commonalities and differences across tasks. The multiple tasks can be learned in parallel using a shared representation among the tasks. As an example, a multitask neural network can share hidden layers among all the tasks, while providing respective task-specific output layers (this is sometimes referred to as hard parameter sharing). As another approach, each task can have its own neural network with its own parameters. A regularization constraint can be used across the layers of the task-specific networks to encourage the parameters to be similar (this is sometimes referred to as soft parameter sharing). Training of multitask networks is described below. Multitask networks can be used in the augmented, mixed, or virtual reality context, where the tasks can include, for example, computer vision tasks such as determining body pose (e.g., head pose), analyzing images to determine gestures made by the user (e.g., hand gestures), etc. Other tasks can include a regression task, a classification task, or a combination thereof. The plurality of tasks can comprise, for example, a perception task, such as the face recognition, visual search, gesture identification or recognition, semantic segmentation, object detection, room layout estimation, cuboid detection, lighting detection, simultaneous localization and mapping, relocalization of an object or an avatar, or speech processing tasks such as speech recognition or natural language processing, or a combination thereof.

Backpropagation can be used in the training of a neural network. Backpropagation can be used to calculate a gradient tensor that is used for the calculation of the weights used in the network. In certain backpropagation techniques, the gradient of a loss function is evaluated with respect to a weight tensor in each layer of the network, and the weights are updated using a learning rule. Gradient tensors recursively evaluated using backpropagation can successfully train deep networks with millions of weight parameters across hundreds of layers and can generalize to many types of neural networks. A mathematical formalism of the generalization ability of deep neural networks trained using backpropagation remains elusive. Indeed, a lack of this formalism has given need to innovate in new fields of deep learning, such as robustness of DNNs in particular to adversarial examples, domain adaptation, transfer learning or multitask learning, model compression, etc. As described herein, gradient tensors derived during backpropagation can provide additional clues to learning in existing or new domains.

Examples of an auxiliary deep learning framework, gradient adversarial training (sometimes referred to herein as GREAT), are applicable to different machine learning problems. In gradient adversarial training, an auxiliary network can be trained to classify an origin of a gradient tensor, and a main network can serve as an adversary to the auxiliary network in addition to a standard task-based training procedure. In contrast to some techniques where an auxiliary neural network is used to improve the output of the main neural network, in some embodiments of GREAT, the auxiliary network is used to improve the gradient tensors of the main network, rather than the output of the main network.

Various embodiments of gradient adversarial training advantageously can increase the robustness of a neural network to targeted adversarial attacks, can be able to better distill the knowledge from a teacher network to a student network compared to soft targets, or can improve multitask learning by aligning gradient tensors derived from the task specific loss functions. Gradient adversarial training can reveal latent information of the task trained on and can support diverse machine learning problems when with integrated with an auxiliary network.

Embodiments of gradient adversarial training can be applied in many scenarios including, but not limited to: (1) as a defense to adversarial examples, gradient adversarial training can classify gradient tensors and tune them to be agnostic to the class of their corresponding example, (2) for knowledge distillation, binary classification of gradient tensors derived from the student or teacher network can be performed and used to tune the student gradient tensor to mimic the teacher's gradient tensor; and (3) for multitask learning, the gradient tensors derived from different task loss functions can be classified and tuned to be statistically indistinguishable. Gradient adversarial training can increase the robustness of a network to adversarial attacks, can be better able to distill the knowledge from a teacher network to a student network compared to soft targets, and can boost multitask learning by aligning the gradient tensors derived from the task specific loss functions. Gradient tensors may contain latent information about the tasks are being trained and can support diverse machine learning problems when guided through adversarialization using an auxiliary network. Gradient adversarial training can reveal this latent information about the tasks being trained.

In various embodiments, the gradient adversarial training methods disclosed herein can be used to train neural networks that have applications in computer vision, natural language processing, speech synthesis, domain-specific applications such as traffic prediction, general cross-domain applications, curriculum learning, multitask learning, knowledge distillation, or adversarial defense. Embodiments of GREAT can be applied to train neural networks used for augmented, mixed, or virtual reality (see, e.g., the augmented reality system described with reference to FIG. 5).

Example Gradient Adversarial Training Methods

The gradient tensor of a scalar loss function with respect to the input or intermediate layer, termed the Jacobian J, may be highly informative or discriminative. Gradient tensors derived during back propagation may serve as an additional cue to aid learning in these new domains. This follows from the equations of backpropagation for a perceptron:

$$\delta^L = \nabla_a C \odot \sigma'(z^L) \quad (1a)$$

$$\delta^l = (w^{l+1})^T \delta^{l+1} \odot \sigma'(z^l) \quad (1b)$$

In Equations (1a) and (1b), $\delta$ is the gradient tensor, l is the layer with L being the final layer, $\nabla_a C$ is the gradient of the loss function C with respect to the neural network output a after the final activation, $\sigma$ is the activation function, $z^l$ is the output after layer l with $a=\sigma'(z^L)$, w is a weight matrix, and $\odot$ is a Hadamard product. It follows from Equations (1a) and (1b) that the gradient tensor at any layer is a function of both the loss function and all succeeding weight matrices. The information from gradient tensors can be employed for regularization, visualizing saliency maps, interpreting DNNs, generating adversarial examples, and for weakly supervised object localization. Current approaches may use the information from the gradient tensor in a separate step to achieve a desired quantitative or qualitative result. Different from such current approaches, certain embodiments of GREAT disclosed herein use the gradient tensor during the training procedure, via an adversarial process.

In some embodiments underlying GREAT, a utilized gradient tensor may be antagonistic to the network's task. For example, in the neural network 100 shown in FIG. 1A, embodiments of GREAT aim to nullify the missing or dark information in the gradient tensors by first processing the gradient tensor in an auxiliary network and then passing an adversarial gradient signal back to the main network via a gradient reversal procedure. This adversarial gradient signal can regularize the weight tensors in the main network. Mathematically, the adversarial gradient signal ϱ flowing forward in the main network can be expressed as:

$$\varrho^{l+1} = -w^{l+1,l} \varrho^R \odot \sigma'(z^l) \quad (2)$$

which is of a similar functional form as $\delta$ but of opposite sign and is affected by preceding weight matrices until the layer of the considered gradient tensor. As networks tend to have perfect sample expressiveness as soon as the number of parameters exceeds the number of data points, regularization provided by the auxiliary network advantageously can improve robustness without considerably affecting performance.

Figure 1B:
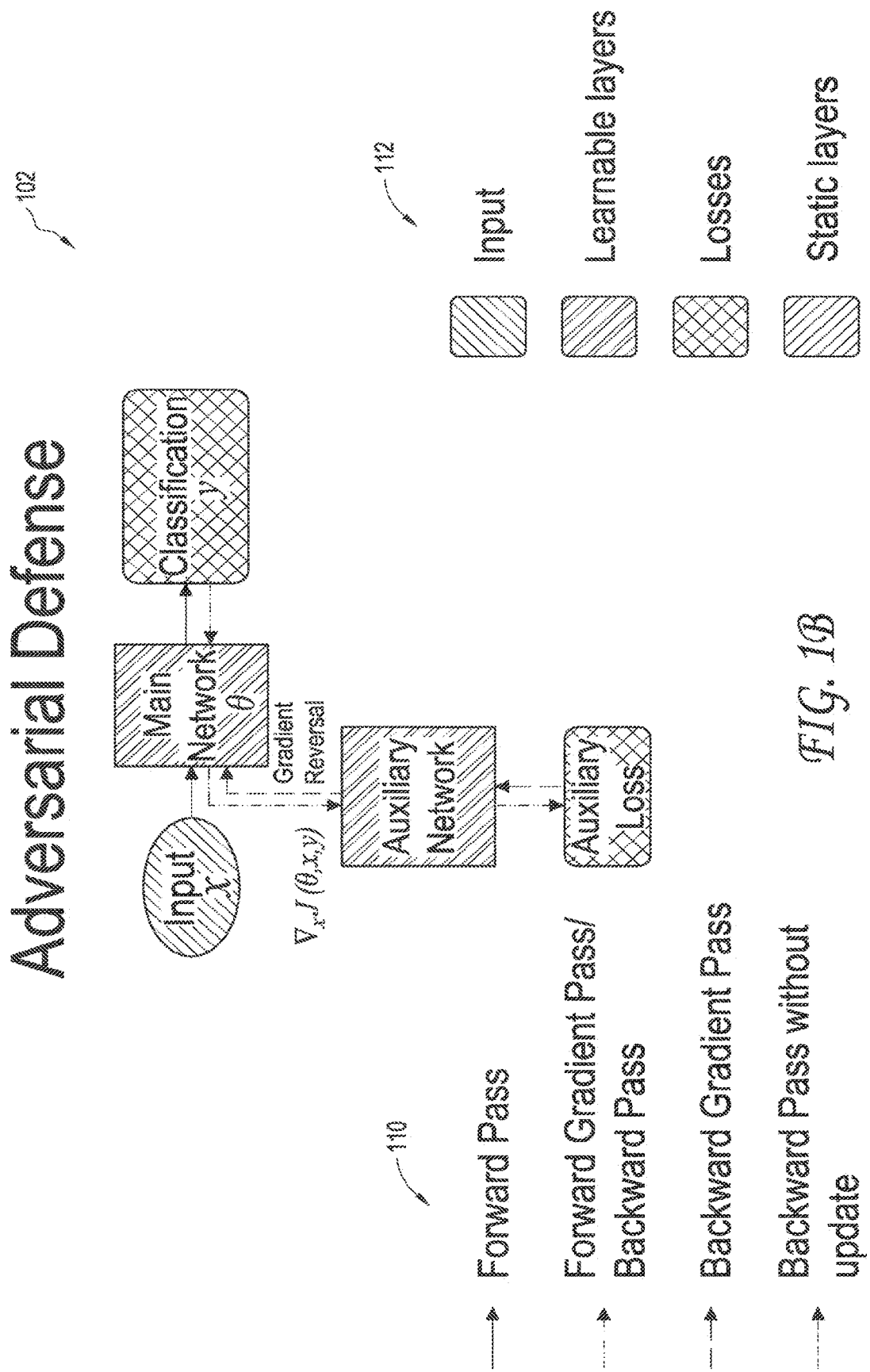
FIG. 1B is a block diagram that shows an example of the GREAT method for adversarial defense. The auxiliary network performs the same classification as the main network, with gradient tensors as input.

Disclosed herein are descriptions of the dark information present in the gradient tensors in three scenarios: (1) a neural network 102 for adversarial examples (see FIG. 1B), (2) a neural network 104 for knowledge distillation (see FIG. 1C), and (3) a neural network 106 for multitask learning (see FIG. 1D). These three neural networks 102, 104, 106 are intended to be illustrative of applications of GREAT but not to limit the scope of GREAT methods for training neural networks.

In the context of neural networks adapted to analyze images, adversarial examples include carefully crafted perturbations applied to normal images, which are usually imperceptible to humans, but can seriously confuse state-of-the-art deep learning models. A common step to adversarial example generation includes calculation of the gradient of an objective function with respect to the input. The objective function may be either the task loss function or its more sophisticated derivative. This gradient tensor is processed to perturb the original image, and the model misclassifies the perturbed image. Embodiments of GREAT make the saliency maps uninformative, and consequently, mitigate the neural network's susceptibility to targeted adversarial examples (see FIG. 1B).

Figure 1C:
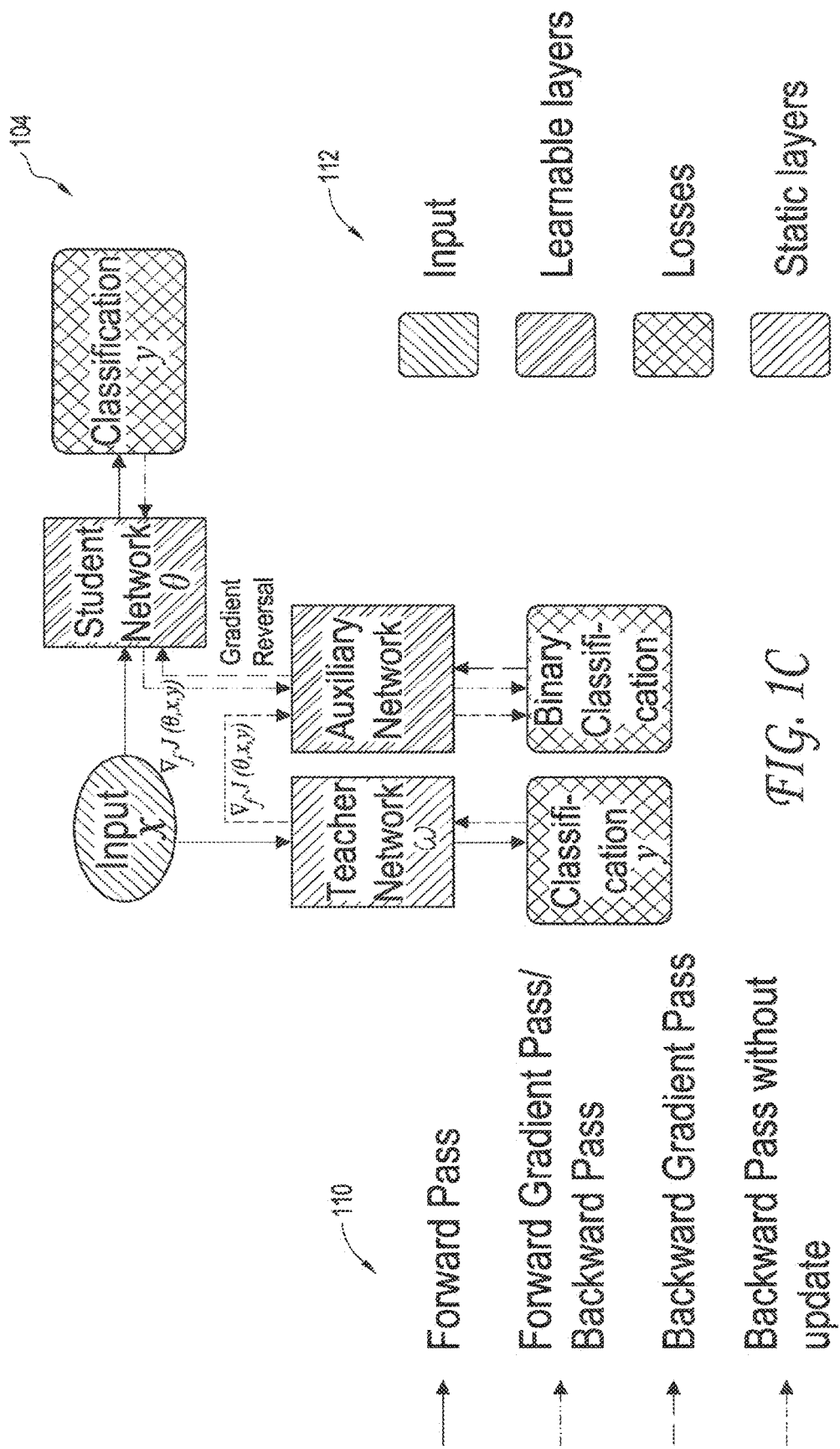
FIG. 1C is a block diagram that shows an example of the GREAT method for knowledge distillation. The auxiliary network performs binary classification on the gradient tensors from student and teacher networks.

An objective of knowledge distillation is to compress the predictive behavior of a complex and cumbersome DNN (teacher network) or an ensemble of DNNs into a much simpler model (student network). Distilling knowledge to a student network can be achieved by matching logits or a soft distribution over classes of the teacher network to the output of the student network in addition to the usual supervised loss function. As shown in FIG. 1C, GREAT provides a complementary approach to knowledge distillation wherein the GREAT method statistically matches the gradient tensor of the student network to the teacher network using an auxiliary network, in lieu of matching output distributions.

Figure 1D:
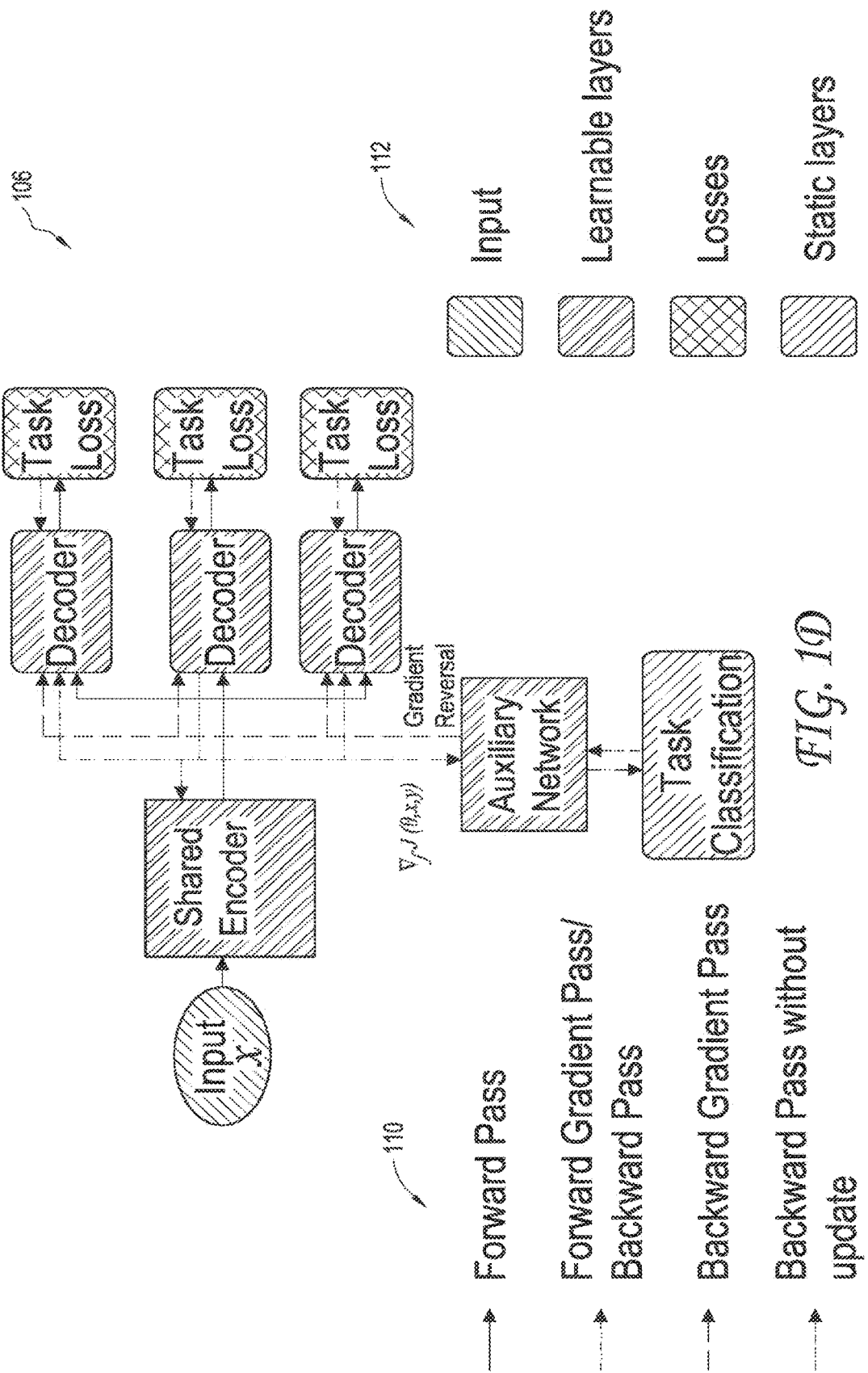
FIG. 1D is a block diagram that shows an example of the GREAT method for multitask learning. The auxiliary networks classify the gradient tensors from the different task decoders and align them through gradient reversal and an explicit gradient alignment layer.

In multitask learning, a single network can be trained end-to-end to achieve multiple related but different task outputs on an input. This can be achieved by having a common encoder and separate task specific decoders. In a perfect multitask learning scenario, the gradient tensors of the individual task-loss functions with respect to the last shared layer in the encoder may be indistinguishable so as to coherently train all the shared layers in the encoder. As shown in FIG. 1D, embodiments of the multitask neural network 106 can train a gradient alignment layer (GAL) between the encoder and the task-specific decoders which operates in the backward pass so that the task-specific gradient tensors are less distinguishable by the auxiliary network.

Examples of GREAT for Adversarial Defense

Figure 2:
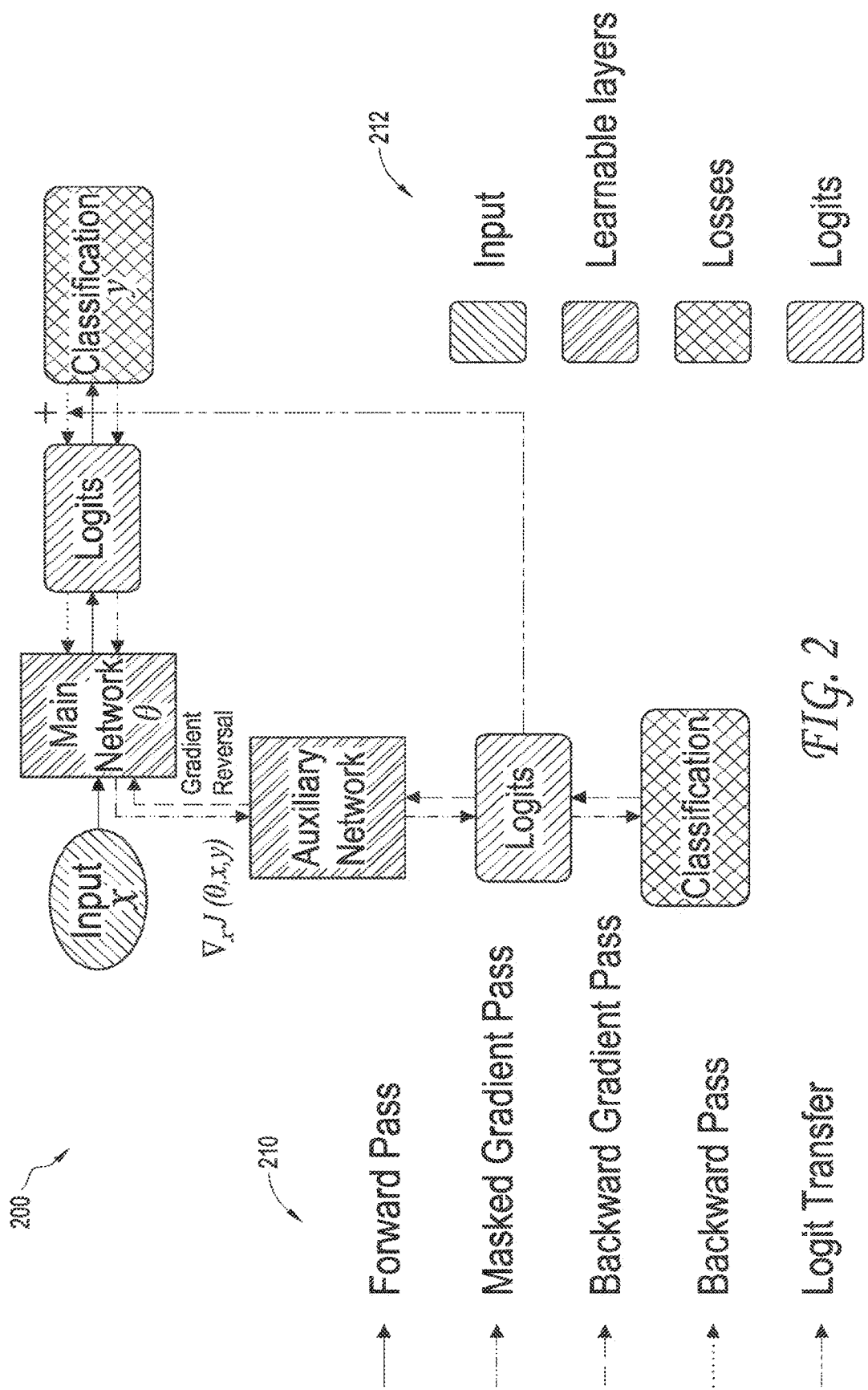
FIG. 2 is a block diagram that shows an embodiment of GREAT tailored for targeted adversarial attacks using a gradient adversarial cross-entropy loss (sometimes referred to as GREACE). Legends at the bottom left and right of FIG. 2 show the different kinds of information flow (left legend 210) and the different kinds of modules in the network (right legend 212).

FIG. 2 shows an embodiment of a neural network 200 trained via GREAT and that can mitigate against targeted adversarial attacks. Targeted adversarial attacks include those that are more malicious than non-targeted attacks. For example, an image of a speed limit sign interpreted as a wrong way can cause a serious accident as opposed to an interpretation of the image as a yield sign. For robustness of targeted as well as non-targeted attacks, a two-pronged defense can be applied to adversarial attacks: (1) an embodiment of gradient adversarial training, and (2) an embodiment of a gradient adversarial cross-entropy loss (sometimes referred to as GREACE). The gradient adversarial cross-entropy loss adapts the cross-entropy loss function to be adversarial when the gradient tensors between two classes are easily confused. For example, an output probability distribution from an auxiliary network can be added to the gradient of the loss with respect to the logits in the main network to help separate negative classes whose gradient tensors are similar to primary class.

A general objective for defense against adversarial examples is:

$$J(\theta, x, y) = J(\theta, x + \Delta, y) \forall \|\Delta\|_p \le \epsilon \quad (3)$$

In Equation (3), x is the input, y is the output, θ are the network parameters, Δ is the perturbation tensor whose p-norm is constrained to be less than ϵ, and J subsumes the loss function and the network architecture. Non-targeted attacks can be calculated by $x+\epsilon f(\nabla J(\theta, x, y))$, e.g., moving in the direction of the gradient where $f$ is a function, usually the sign function in a Fast Gradient Sign Method (FGSM). Targeted attacks can be calculated by $x-\epsilon(\nabla J(\theta, x, \bar{y}))$ for $\bar{y} \ne y$, e.g., using gradient descent. Using a first order Taylor series approximation in Equation (3) provides an equivalent formulation:

$$\nabla J(\theta, x + \Delta, y)\Delta = 0 \forall \|\Delta\|_p \le \epsilon \quad (4)$$

Some attempts at adversarial defenses have focused on minimizing $\|\nabla J(\theta, x+\Delta, y)\|_p$ locally at the training points. However, this can lead to a sharp curvature of the loss surface near those points, violating the first order approximation, which makes the defense ineffective.

Instead, the GREAT procedure can remove the class-specific information present in the gradient tensor. Formally, for all N samples in the training set:

$$\nabla J(\theta, x_i, y_i) = \nabla J(\theta, x_i, \hat{y}_i) \text{ and } \forall \hat{y}_i \ne y_i \forall i \in N \quad (5)$$

In the absence of class-specific information, a single-step targeted attack is difficult as the perturbation tensor is class-agnostic. However, an adversary may mount a multi-step attack or evaluate a universal adversarial perturbations which might fool the classifier.

Hence, as a second line of defense, a gradient-adversarial cross-entropy (GREACE) loss may additionally or alternatively be used. GREACE up-weights the backward gradient magnitude, and hence the loss assigned to classes whose gradients are easily confused with the gradient of the primary class, similar in spirit to focal loss. This can help separate the high-dimensional decision boundary of classifiers from the perspective of classes whose gradients are similar.

For example, GREACE can adapt the cross-entropy loss function to add weight to the negative classes whose gradient tensors are similar to those of a primary class. The weight can be added to the negative classes in the gradient tensor flowing backward from the soft-max activation, before back-propagating through the rest of the main network (see FIG. 2). The weight can be evaluated using a soft-max distribution from the auxiliary network which indicates the similarity of gradient tensor of the primary class to the negative classes. This added weight can help separate the high-dimensional decision boundary between easily confused classes, similar in spirit to confidence penalty and focal loss, albeit from the perspective of gradients.

Mathematically, the gradient tensor from the cross-entropy loss is modified in the following way:

$$\nabla_a \hat{C} = \nabla_a C + \beta * \sigma(a') 1_{\hat{y} \ne y} \quad (6)$$

Here, $\hat{C}$ and C are the GREACE and original cross-entropy functions respectively, a and a' are the output activations from the main and auxiliary network respectively, σ is the soft-max function, β is a penalty parameter, and $1_{\hat{y} \ne y}$ is a one-hot function for all ŷ not equal to the original class y.

The gradient tensor, in some embodiments, is masked after passing through the soft-max function in the main network, $\nabla C_a 1_y$ to evaluate the gradient tensors to be passed into the auxiliary network. This may avoid the auxiliary classifier from catching on to gradient cues from other classes and primarily concentrates on the class in question. In other embodiments, an unmasked gradient tensor can be used.

In some embodiments, the combined objective for adversarial defense is:

$$\min_\theta \hat{J}(\theta, x, y) + \alpha \max_{\theta'} J(\theta', \nabla \bar{J}(\theta, x, y), y) \quad (7)$$

where $\hat{J}$ indicates the GREACE, J indicates the standard cross-entropy, $\bar{J}$ indicates the masked cross entropy, and α is a weight parameter for the auxiliary network's loss.

An example of pseudo-code for defense against adversarial examples using GREAT and GREACE is shown in Table 1.

TABLE 1

| | |
|---|---|
| 1: procedure TRAIN(θ, θ̂,) | Uses inputs x, lables y, penalty β |
| 2:   while j < $j_{max}$ do | j is current iteration |
| 3:     C ← J(θ, x, y) | Main network loss by forward pass |
| 4:     g ← ∇J(θ, x, y) | Evaluate masked gradient tensor with respect to (w.r.t.) x |
| 5:     Ĉ ← J(θ̂, g, y) | Auxiliary network loss by forward pass |
| 6:     θ̂(j) → θ̂(j + 1) | Update weights in auxiliary network using Ĉ |
| 7:     ∇Ĉ_g ← −α∇J(θ̂, g, y) | Evaluate reversed gradient w.r.t. g |
| 8:     ∇_a Ĉ ← ∇_a C + β * S(á)1_{ŷ≠y} | Evaluate GREACE loss |
| 9:     θ(j) → θ(j + 1) | Update weights in main network using $\nabla_a \hat{C}, \nabla_g \hat{C}$ |

Examples of GREAT for Knowledge Distillation

Embodiments of GREAT can be applied for knowledge distillation. As described earlier, matching the gradient distribution of the student model and the teacher model is a complementary approach to matching soft output distributions, such that the student's output distribution S(x) mimics the teacher's output distribution T(x). Two functions can be shown to have equal derivatives on an interval using mean value theorem, and therefore they differ by a constant. It implies that if $\nabla S(x) = \nabla T(x)$, then $T(x) - S(x)$ is a constant.

This constant difference can be learned during supervised training of the student model on the true labels. As another example, GREAT can provide a solution for the student output S(x) that jointly minimizes the supervised loss and ∇S(x)=∇T(x) exists.

GREAT can use a discriminator to match the gradient distributions owing to the success of adversarial losses over traditional regression-based loses. The GREAT embodiments for knowledge distillation may parallel a gradient adversarial network training procedure. A binary classifier discriminates between student and teacher model gradients, similar to the discriminator which distinguishes real and fake samples. The binary classifier discriminates between student and teacher model gradients and drives the student model to generate gradient tensor distribution similar to the teacher model as shown in FIG. 1C.

In some embodiments, the objective to be optimized is:

$$(1-\alpha)\min_\theta J(\theta, x, y) + \alpha \min_\theta \max_\omega D(\theta, \omega, x, y) \quad (8a)$$

$$D(\theta, \omega, x, y) = E_{t \sim \nabla T(x)}\log f(t, \omega) + E_{s \sim \nabla J(\theta,x,y)}\log(1 - f(s, \omega)) \quad (8b)$$

In Equations (8a) and (8b), the function $f$ is the binary classifier with parameters $\omega$; s and t are the gradient tensors from the student and teacher network, respectively, E denotes expectation, and $\alpha$ is a loss balancing parameter. The advantage of the above formulation over traditional distillation is that there is no temperature parameter to soften the logits distribution which can be hard to set. However, the GREAT method may train the binary classifier, which amounts to an extra backward pass through the student network.

An example of pseudo-code for knowledge distribution using GREAT is shown in Table 2.

TABLE 2

| | | |
|---|---|---|
| 1: | procedure TRAIN(θ, θ̂,) | Uses inputs x, teacher T with parameters τ |
| 2: | while j < j$_{max}$ do | j is current iteration |
| 3: | C ← J(θ, x, y) | Student network loss by forward pass |
| 4: | g$_s$ ← ∇J(θ, x, y) | Evaluate student gradient tensor w.r.t. x |
| 5: | g$_t$ ← ∇J(τ, x, y) | Evaluate teacher gradient tensor w.r.t. x |
| 6: | Ĉ ← Ĵ(θ̂, g$_t$, 1) + Ĵ(θ, g$_s$, 0) | Binary classifier loss by forward pass |
| 7: | θ̂(j) → θ̂(j + 1) | Update weights in auxiliary network using Ĉ |
| 8: | ∇C ← (1 − α)∇J(θ, x, y) | Evaluate gradient tensor of loss |
| 9: | ∇$_{g_s}$Ĉ ← α∇Ĵ(θ, g$_s$, 0) | Evaluate reversed gradient w.r.t. gs |
| 10: | θ(j) → θ(j + 1) | Update weights in main network using ∇C, ∇$_{g_s}$Ĉ |

Examples of GREAT for Multitask Learning

Figure 3:
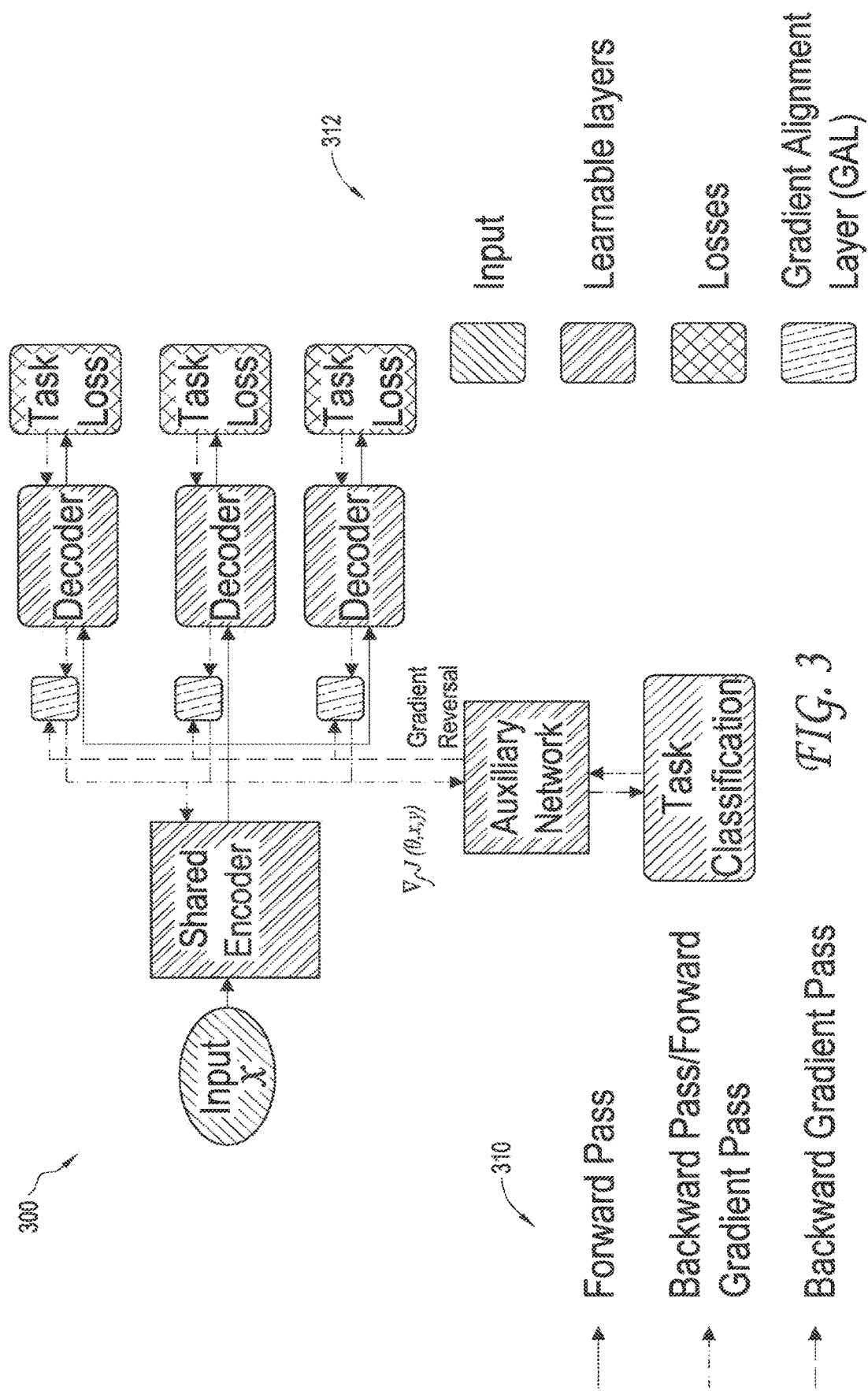
FIG. 3 is a block diagram that shows an embodiment of GREAT for modifying gradient normalization networks. Legends at the bottom left and right of FIG. 3 show the different kinds of information flow (left legend 310) and the different kinds of modules in the network (right legend 312).

FIG. 3 is a block diagram that shows an embodiment of a neural network 300 utilizing GREAT for modifying gradient normalization networks. Some of the gradient normalization techniques in the network 300 may be similar to those described in U.S. Patent Publication No. 2019/0130275, "Gradient Normalization Systems and Methods for Adaptive Loss Balancing in Deep Multitask Networks," which is hereby incorporated by reference herein in its entirety.

In the embodiment illustrated in FIG. 3: (1) gradients are not required to have equal norm, but instead, are required to have similar statistical distributions. This can be achieved by the auxiliary network similar to a discriminator in a gradient adversarial network setting, and (2) instead of assigning task-weights, extra-capacity is added to the network in the form of gradient-alignment layers (GALs). These layers can be placed after the shared encoder and before each of the task-specific decoders, can have the same dimensions as the last shared feature tensor minus the batch size, and may only be active during the backward pass. For an N-task network, the N*channel*width*depth parameters in the GALs help adapt the gradient tensor emanating from each of the tasks far beyond the N task-weight parameters in other techniques. In some embodiments, the GALs have the same dimensions as the last shared feature tensor minus the batch size and are active only during the backward pass, e.g., the GALs are dropped during forward inference. The GALs may be trained using reversed gradients from the auxiliary network task classifier.

As shown in FIG. 3, the auxiliary network receives the gradient tensor from each task as an input and classifies them according to task. Successful classification implies the gradient tensors are discriminative, which in turn impedes the training of the shared encoder as the gradients are misaligned. In the worst case scenario, the gradient vector fields for two tasks point in opposite directions and no learning takes place in the shared encoder. The GALs mitigate the misalignment by element-wise scaling of the gradient tensors from all tasks. These layers are trained using the reversed gradient signal from the auxiliary network, e.g., the GALs attempt to make the gradient tensors indistinguishable. Intuitively, the GALs observe the statistical irregularities that prompt the auxiliary classifier to successfully discriminate between the gradient tensors, and then adapt the tensors to remove the irregularities or equalize the statistical distributions. Note, that the task losses are normalized by the initial loss so that the alignment layers are tasked with local alignment and not global loss scale alignment. The soft-max activation function in the auxiliary network's classification layer implicitly normalizes the gradients. The values in the GAL weight tensors can be initialized with value one. The values can be restricted to be positive for training to converge. In experiments, it was observed that a low learning rate ensured positivity of the GAL tensors.

The overall objective for multitask learning is:

$$\min_{\theta, \omega_1, \ldots, N} \sum_i^N J_i(\theta, m_i, \gamma_i, x, y_i) + \max_{\hat{\theta}, \gamma_i \ldots N} \hat{J}(\hat{\theta}, \nabla J_i(\omega_i, x, y_i)\gamma_i, \hat{y}) \quad (9)$$

where $J_i$ indicates the normalized task losses, J' indicates the N-class cross-entropy loss, θ, θ' are the learnable parameters in the shared encoder and auxiliary classifier respectively, $\omega_i$, $\gamma_i$, $y_i$ are the decoder parameters, GAL parameters, and ground-truth task outputs for task i respectively, and y' represents the task labels.

An example of pseudo-code for multitask learning using GREAT on GALs is shown in Table 3.

TABLE 3

| | | |
|---|---|---|
| 1: | procedure TRAIN($\theta$, $\hat{\theta}$, $\omega_i$, $\gamma_i$) | Uses inputs x, labels for tasks $y_i$ |
| 2: | $\gamma_i \leftarrow 1$ | Initialize GAL tensors with ones |
| 3: | $C_i^0 \leftarrow J_i(\theta, \omega_i, x, \gamma_i)$ | Base task losses by forward pass |
| 4: | while $j < j_{max}$ do | j is current iteration |
| 5: | $C_i \leftarrow J_i(\theta, \omega_i, x, \gamma_i) \forall i$ | Task losses by forward pass |
| 6: | $C_i \leftarrow \dfrac{c_i}{c_i^0} \forall i$ | Normalize task losses |
| 7: | $g_i^f \leftarrow \nabla J_i(\omega_i, x, \gamma_i) \forall i$ | Evaluate task gradient tensors w.r.t. feature f |
| 8: | $\omega_i(j) \rightarrow \omega_i(j+1) \forall i$ | Update weights in decoders using $\nabla C_i$ |
| 9: | $\theta(j) \rightarrow \theta(j+1)$ | Update weights in encoder using $\Sigma_i g_i^f \gamma_i$ |
| 10: | $\hat{C} \leftarrow \hat{J}(\hat{\theta}, g_i^f \gamma_i, \hat{y})$ | Task classification loss by forward pass |
| 11: | $\hat{\theta}(j) \rightarrow \hat{\theta}(j+1)$ | Update weights in task classifier network using $\hat{C}$ |
| 12: | $\nabla_{\gamma_i} \hat{C} \leftarrow -\nabla \hat{J}(\hat{\theta}, g_i^f \gamma_i, \hat{y})$ | Evaluate reversed gradient w.r.t. $\gamma_i$ |
| 13: | $\gamma_i(j) \rightarrow \gamma_i(j+1) \forall i$ | Update weights in GALs using $\nabla_{\gamma_i} \hat{C}$ |

Results

Example results of embodiments of the GREAT procedure for each domain will now be presented. The performance of GREAT on multiple datasets will be used to illustrate the generality of the GREAT techniques.

GREAT for Adversarial Defense

GREAT techniques were applied to the CIFAR-10, MNIST datasets, and on the mini-ImageNet dataset. The mini-ImageNet dataset is a subset of the original ImageNet dataset with 200 classes, and 500 training and 50 test samples for each class. For all three datasets, a ResNet architecture was used. It was observed that ResNet models are more effective in the GREAT training paradigm relative to models without skip connections. In GREAT, skip connections can help propagate the gradient information in the usual backward pass, as well as forward propagate the reversed gradient from the auxiliary classifier network through the main network. In the experiments, the auxiliary network was a shallower version of the main network. ADAM (a method for stochastic optimization derived from adaptive moment estimation to update network weights) was used with initial learning rate of 0.001 to train both the main and auxiliary network, and lr, the learning rate multiplier was calculated as:

$$\left(1 - \dfrac{e}{e\max}\right)^{0.9} \quad (10)$$

where e, $e_{max}$ are the current epoch and total epochs, respectively. The auxiliary loss weight parameter $\alpha$ and the penalty parameter $\beta$ follow the rate policy of (1−lr) and $\beta_{max}(1-lr)$, e.g., they gradually increase to the final value so as to not interfere with the main classification task during initial training epochs. Different values of $\beta_{max}$ for each of the datasets were used, and were set to 20, 2, 0.1 for MNIST, CIFAR-10, and mini-ImageNet, respectively. These values optimally defend against adversarial examples, while not adversely affecting the test accuracy on the original samples. The exact network architectures and additional parameters are discussed in the appendix.

The GREAT method was evaluated against targeted and non-targeted adversarial examples using the fast gradient sign method (FGSM) and its iterated version (iFGSM) for 10 iterations. For targeted attacks, results are reported for a random target class as well as worst (least probability) target class. The GREAT method is compared against adversarial training and base network with no defense mechanism. For CIFAR-10, the results are reported for expensive robust optimization procedure, which is the current state-of-the-art defense.

TABLE 4

CIFAR-10 accuracy values of different adversarial training methods on targeted and non-targeted attacks using FGSM and iFGSM using a maximum allowed perturbation $\epsilon = 0.3$.

| | | | Non-Targeted | | Targeted | | | |
|---|---|---|---|---|---|---|---|---|
| | | | | | FGSM | | iFGSM | |
| Method | Train | No-Attack | FGSM | iFGSM | Random | Worst | Random | Worst |
| Baseline Adversarial Robust | 99.97 | 93.32 | 2.37 | 0.34 | | 8.72 | | 4.1 |
| GREACE | 93.37 | 90.45 | 71.38 | 68.91 | | 86.38 | | 72.86 |
| GREAT | 99.50 | 91.89 | 38.54 | 10.69 | | 87.76 | | 4.83 |
| GRE(AT + CE) | 92.518 | 89.88 | 69.12 | 76.08 | | 87.85 | | 76.06 |

TABLE 5

MNIST accuracy values of different adversarial training methods on targeted and non-targeted attacks using FGSM and iFGSM using a maximum allowed perturbation $\epsilon = 0.2$.

| | | | | | Targeted | | | |
| | | | Non-Targeted | | FGSM | | iFGSM | |
| Method | Train | No-Attack | FGSM | iFGSM | Random | Worst | Random | Worst |
| --- | --- | --- | --- | --- | --- | --- | --- | --- |
| Baseline Adversarial | 100.0 | 93.58 | 22.76 | 5.84 | | 95.87 | | 40.77 |
| GREACE | 100 | 99.59 | 17.82 | 6.49 | | 97.24 | | 53.43 |
| GREAT | 99.93 | 99.35 | 53.74 | 6.66 | | 91.99 | | 30.62 |
| GRE(AT + CE) | 98.78 | 98.94 | 82.14 | 75.86 | | 95.59 | | 54.78 |

TABLE 6 mini-ImageNet top-1 accuracy values of different adversarial training methods on targeted and non-targeted attacks using FGSM and iFGSM using a maximum allowed perturbation $\epsilon = 0.05$.

| | | | | | Targeted | | | |
| | | | Non-Targeted | | FGSM | | iFGSM | |
| Method | Train | No-Attack | FGSM | iFGSM | Random | Worst | Random | Worst |
| --- | --- | --- | --- | --- | --- | --- | --- | --- |
| Baseline Adversarial | 100.0 | 93.58 | 22.76 | 5.84 | | 95.87 | | 40.77 |
| GREACE | 100 | 99.59 | 17.82 | 6.49 | | 97.24 | | 53.43 |
| GREAT | 99.93 | 99.35 | 53.74 | 6.66 | | 91.99 | | 30.62 |
| GRE(AT + CE) | 98.78 | 98.94 | 82.14 | 75.86 | | 95.59 | | 54.78 |

Tables 4, 5, and 6 demonstrate that embodiments of GREAT can improve robustness against single step targeted and non-targeted adversarial examples on all three datasets, whereas GREACE in isolation is robust to iterated targeted examples. GREACE may act as a strong regularizer, and the combination of GREACE and GREAT may prevent overfitting to the training set. The combination of GREAT and GREACE improves robustness against all adversarial examples. It was also found that saliency maps for GREAT and GREACE were sparse and predominantly activated within the object, hence, mitigating adversarial examples.

GREAT for Knowledge Distribution

GREAT's potential for knowledge distillation was evaluated on the CIFAR-10 and mini-ImageNet datasets. Two scenarios were investigated: (a) all training examples used for the teacher model were used to train the student model, and (b) only 5% of original training samples were used to train the student models.

For CIFAR-10, a 5-layer CNN and a pretrained ResNet-18, and a ResNet-18 and a pretrained ResNext-29-8 were used as student-teacher combinations. For mini-ImageNet, a ResNet-18 and a pretrained ResNet-152 were used as the student-teacher combination. GREAT was compared against a baseline model trained only on cross-entropy loss and against the distilled model trained using a combination of cross-entropy and unsupervised Kullback-Leibler (KL) loss. It was found that GREAT consistently performs better than the baseline and distillation in the sparse training regime, indicating better regularization by the gradient adversarial signal. GREAT was able to coherently distill the model for both the dense and sparse training regimes across different student-teacher combinations.

GREAT for Multitask Learning

An embodiment of GREAT was tested for multitask learning on 2 datasets: CIFAR-10 where the input was a noisy gray-scale image and the tasks were (i) classification, (ii) colorization, (iii) edge detection, and (iv) denoised reconstruction; and the NYUv2 dataset where the tasks were (i) depth estimation, (ii) surface-normal estimation, and (iii) keypoint estimation.

The GREAT results were compared against the baseline of equal weights, gradient normalization, and uncertainty based weighting. For all methods, the same architecture was used: a ResNet-53 with dilation convolution backbone and task-specific decoders. Table 7 discloses various results for multitask learning of CIFAR-10 (RMSE is Root Mean Square Error). Table 8 discloses results for multitask learning of NYUv2. It can be seen that GREAT performs better than gradient normalization on both datasets. Although uncertainty weighting does better on easy tasks such as auto-encoding, GREAT performs well across all tasks.

TABLE 7

| Method | Class % Acc. | Color RMSE | Edge RMSE | Auto RMSE |
| --- | --- | --- | --- | --- |
| Equal | 76.0 | 0.174 | 1.222 | 0.129 |
| Uncertainty | 72.9 | 0.116 | 0,716 | 0.066 |
| Gradient Normalization | 76.0 | 0.150 | 0.736 | 0.103 |
| GREAT | 75.8 | 0,130 | 0.639 | 0.079 |

TABLE 8

| Method | Depth RMSE(m) | Normal (1-cos) | Keypoints RMSE |
|---|---|---|---|
| Equal | 0.783 | 0.302 | 0.644 |
| Uncertainty | 0.678 | 0.290 | 0.540 |
| Gradient Normalization | 0.701 | 0.228 | 0.638 |
| GREAT | 0,638 | 0,238 | 0.569 |

Summary of Results

Examples of systems and methods for gradient adversarial training have been described herein. These examples demonstrate applicability of GREAT in diverse scenarios including but not limited to defense against adversarial examples to knowledge distillation to multitask learning. Embodiments of GREAT can provide one or more of: (a) a strong defense to both targeted and non-targeted adversarial examples, (b) easy distillation of knowledge from different teacher networks without heavy parameter tuning, or (c) aid multitask learning by tuning a gradient alignment layer.

In various embodiments, other forms of loss functions beyond GREACE that are symbiotic with GREAT can be used, progressive training of student networks using other gradient adversarial network (GAN) techniques (e.g., Progressive-GAN) can be used to better learn from the teacher network, and the explicit parameters in the GALs can be absorbed directly into the optimizer, for example, as done with the mean and variance estimates for each weight parameter in ADAM. The general approach underlying GREAT (see, e.g., the neural network 100 shown in FIG. 1A) of passing an adversarial gradient signal to a main network is broadly applicable to domains beyond the ones described herein such as, e.g., to the discriminator in domain adversarial training and GANs. Direct gradient tensor evaluation can be replaced with synthetic gradients for efficiency. Understanding gradient distributions may help uncover the underlying mechanisms that govern the successful training of deep neural network architectures using backpropagation, and gradient adversarial training is a step towards this direction.

Process for Gradient Adversarial Training of a Neural Network

Figure 4:
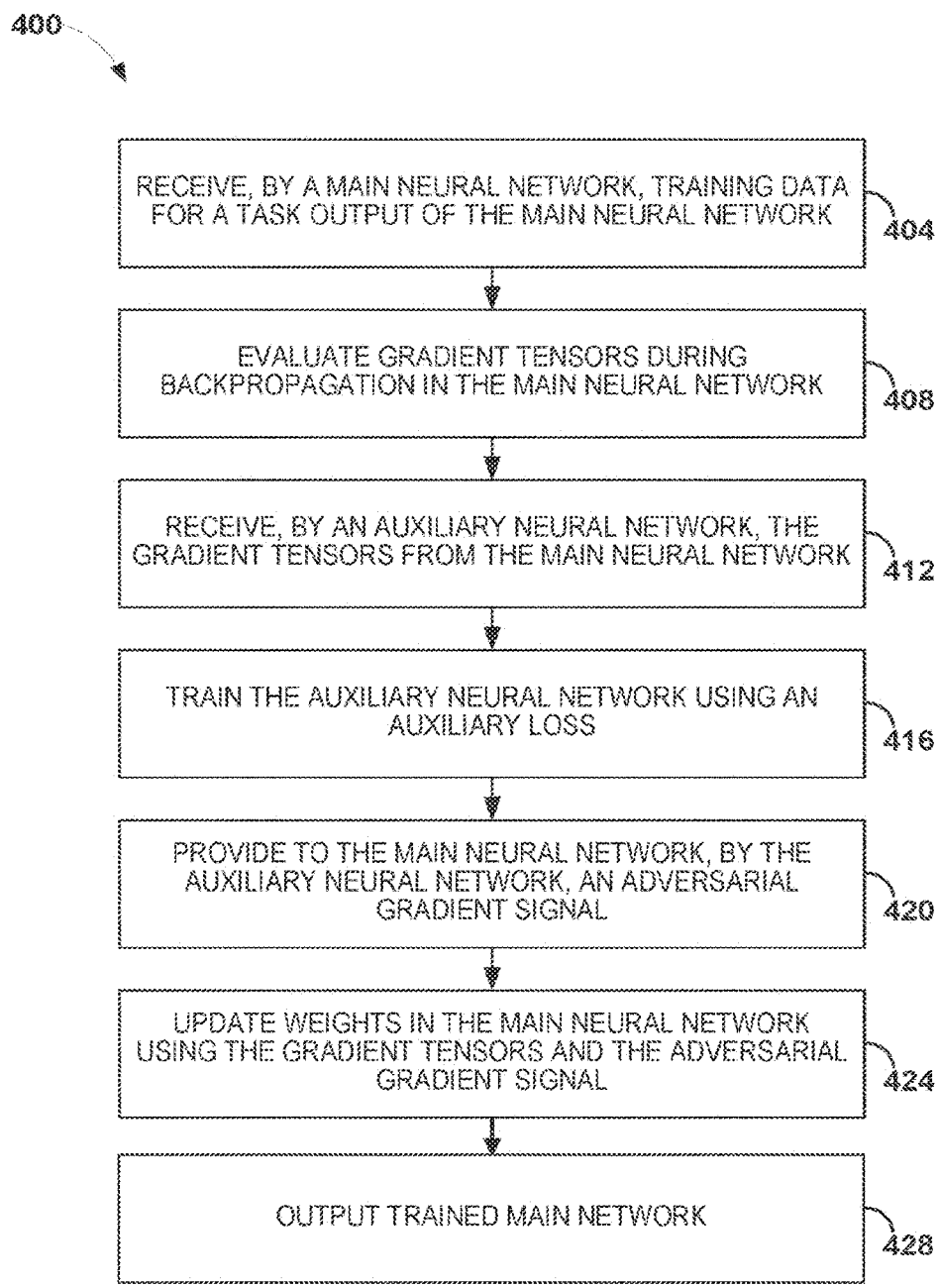
FIG. 4 is a flow diagram of an example process of training a neural network using GREAT.

FIG. 4 is a flow diagram of an example process 400 of gradient adversarial training of a neural network. The process 400 can be performed by a hardware processor such as, for example, the local processing and data module 524 or the remote processing module 528 (which will be described below with reference to FIG. 5). The example process 400 will be described with reference to the neural network 100 described with reference to FIG. 1A. The neural network 100 includes a main network trained to perform a task and an auxiliary network that is used to improve the gradient tensors of the main network via the GREAT methodology. The main network can include an adversarial defense network, a knowledge distillation network, a multitask network, or any other type of neural network (DNN, CNN, etc.). In various embodiments relating to augmented, mixed, or virtual reality, the main network may perform computer vision tasks such as, for example, classifying poses or gestures of a user, face or speech recognition, object detection, room layout estimation, cuboid detection, localization and mapping, and so forth. The main network may perform knowledge distillation or adversarial defense in some embodiments.

The process 400 starts at block 404, where the main neural network receives training data that is used to train the main network to perform a task. As noted above, the task may include a computer vision task, a knowledge distillation task, and so forth. The training data may include images for computer vision tasks.

At block 408, the main network is trained. The training can include backpropagation to calculate a gradient tensor that is used for the calculation of the weights used in the main network. In certain backpropagation techniques, the gradient of a loss function is evaluated with respect to a weight tensor in each layer of the network, and the weights are updated using a learning rule. Gradient tensors recursively evaluated using backpropagation can successfully train deep networks with millions of weight parameters across hundreds of layers and can generalize to many examples. During backpropagation, gradient tensors can be calculated using Equations (1a) and (1b).

At block 412, the auxiliary network receives the gradient tensors evaluated during backpropagation in the main network. At block 416, the auxiliary network is trained using an auxiliary loss function. The training can be used to nullify the missing or dark information in the gradient tensors, as described above. The auxiliary network can calculate the adversarial gradient signal via Equation (2). At block 420, the auxiliary network passes an adversarial gradient signal back to the main network, for example, via a gradient reversal procedure.

At block 424, the weights in the main network can be updated based at least partly on the gradient tensors and the adversarial gradient signal received from the auxiliary network. For example, the adversarial gradient signal can be used to regularize the weight tensors in the main network. At block 428, the process 400 can output the main network, trained via the GREAT procedure. For example, the trained network can be stored by the local processing and data module 524 of the wearable display system 500 described with reference to FIG. 5.

Example NN Layers

A layer of a neural network (NN), such as a deep neural network (DNN) can apply a linear or non-linear transformation to its input to generate its output. A deep neural network layer can be a normalization layer, a convolutional layer, a softsign layer, a rectified linear layer, a concatenation layer, a pooling layer, a recurrent layer, an inception-like layer, or any combination thereof. The normalization layer can normalize the brightness of its input to generate its output with, for example, L2 normalization. The normalization layer can, for example, normalize the brightness of a plurality of images with respect to one another at once to generate a plurality of normalized images as its output. Non-limiting examples of methods for normalizing brightness include local contrast normalization (LCN) or local response normalization (LRN). Local contrast normalization can normalize the contrast of an image non-linearly by normalizing local regions of the image on a per pixel basis to have a mean of zero and a variance of one (or other values of mean and variance). Local response normalization can normalize an image over local input regions to have a mean of zero and a variance of one (or other values of mean and variance). The normalization layer may speed up the training process.

The convolutional layer can apply a set of kernels that convolve its input to generate its output. The softsign layer can apply a softsign function to its input. The softsign function (softsign(x)) can be, for example, (x/(1+|x|)). The softsign layer may neglect impact of per-element outliers. The rectified linear layer can be a rectified linear layer unit (ReLU) or a parameterized rectified linear layer unit (PRELU). The ReLU layer can apply a ReLU function to its input to generate its output. The ReLU function ReLU(x) can be, for example, max(0, x). The PRELU layer can apply a PRELU function to its input to generate its output. The PRELU function PRELU(x) can be, for example, x if x≥0 and ax if x<0, where a is a positive number. The concatenation layer can concatenate its input to generate its output. For example, the concatenation layer can concatenate four 5×5 images to generate one 20×20 image. The pooling layer can apply a pooling function which down samples its input to generate its output. For example, the pooling layer can down sample a 20×20 image into a 10×10 image. Non-limiting examples of the pooling function include maximum pooling, average pooling, or minimum pooling.

At a time point t, the recurrent layer can compute a hidden state s(t), and a recurrent connection can provide the hidden state s(t) at time t to the recurrent layer as an input at a subsequent time point t+1. The recurrent layer can compute its output at time t+1 based on the hidden state s(t) at time t. For example, the recurrent layer can apply the softsign function to the hidden state s(t) at time t to compute its output at time t+1. The hidden state of the recurrent layer at time t+1 has as its input the hidden state s(t) of the recurrent layer at time t. The recurrent layer can compute the hidden state s(t+1) by applying, for example, a ReLU function to its input. The inception-like layer can include one or more of the normalization layer, the convolutional layer, the softsign layer, the rectified linear layer such as the ReLU layer and the PRELU layer, the concatenation layer, the pooling layer, or any combination thereof.

The number of layers in the NN can be different in different implementations. For example, the number of layers in the DNN can be 50, 100, 200, or more. The input type of a deep neural network layer can be different in different implementations. For example, a layer can receive the outputs of a number of layers as its input. The input of a layer can include the outputs of five layers. As another example, the input of a layer can include 1% of the layers of the NN. The output of a layer can be the inputs of a number of layers. For example, the output of a layer can be used as the inputs of five layers. As another example, the output of a layer can be used as the inputs of 1% of the layers of the NN.

The input size or the output size of a layer can be quite large. The input size or the output size of a layer can be n×m, where n denotes the width and m denotes the height of the input or the output. For example, n or m can be 11, 21, 31, or more. The channel sizes of the input or the output of a layer can be different in different implementations. For example, the channel size of the input or the output of a layer can be 4, 16, 32, 64, 128, or more. The kernel size of a layer can be different in different implementations. For example, the kernel size can be n×m, where n denotes the width and m denotes the height of the kernel. For example, n or m can be 5, 7, 9, or more. The stride size of a layer can be different in different implementations. For example, the stride size of a deep neural network layer can be 3, 5, 7 or more.

In some embodiments, a NN can refer to a plurality of NNs that together compute an output of the NN. Different NNs of the plurality of NNs can be trained for different tasks. A processor (e.g., a processor of the local data processing module 524 described with reference to FIG. 5) can compute outputs of NNs of the plurality of NNs to determine an output of the NN. For example, an output of a NN of the plurality of NNs can include a likelihood score. The processor can determine the output of the NN including the plurality of NNs based on the likelihood scores of the outputs of different NNs of the plurality of NNs.

Example Wearable Display System

In some embodiments, a user device can be, or can be included, in a wearable display device, which may advantageously provide a more immersive virtual reality (VR), augmented reality (AR), or mixed reality (MR) experience, where digitally reproduced images or portions thereof are presented to a wearer in a manner wherein they seem to be, or may be perceived as, real.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. For example, displays containing a stack of waveguides may be configured to be worn positioned in front of the eyes of a user, or viewer. The stack of waveguides may be utilized to provide three-dimensional perception to the eye/brain by using a plurality of waveguides to direct light from an image injection device (e.g., discrete displays or output ends of a multiplexed display which pipe image information via one or more optical fibers) to the viewer's eye at particular angles (and amounts of divergence) corresponding to the depth plane associated with a particular waveguide.

In some embodiments, two stacks of waveguides, one for each eye of a viewer, may be utilized to provide different images to each eye. As one example, an augmented reality scene may be such that a wearer of an AR technology sees a real-world park-like setting featuring people, trees, buildings in the background, and a concrete platform. In addition to these items, the wearer of the AR technology may also perceive that he "sees" a robot statue standing upon the real-world platform, and a cartoon-like avatar character flying by which seems to be a personification of a bumble bee, even though the robot statue and the bumble bee do not exist in the real world. The stack(s) of waveguides may be used to generate a light field corresponding to an input image and in some implementations, the wearable display comprises a wearable light field display. Examples of wearable display device and waveguide stacks for providing light field images are described in U.S. Patent Publication No. 2015/0016777, which is hereby incorporated by reference herein in its entirety for all it contains.

Figure 5:
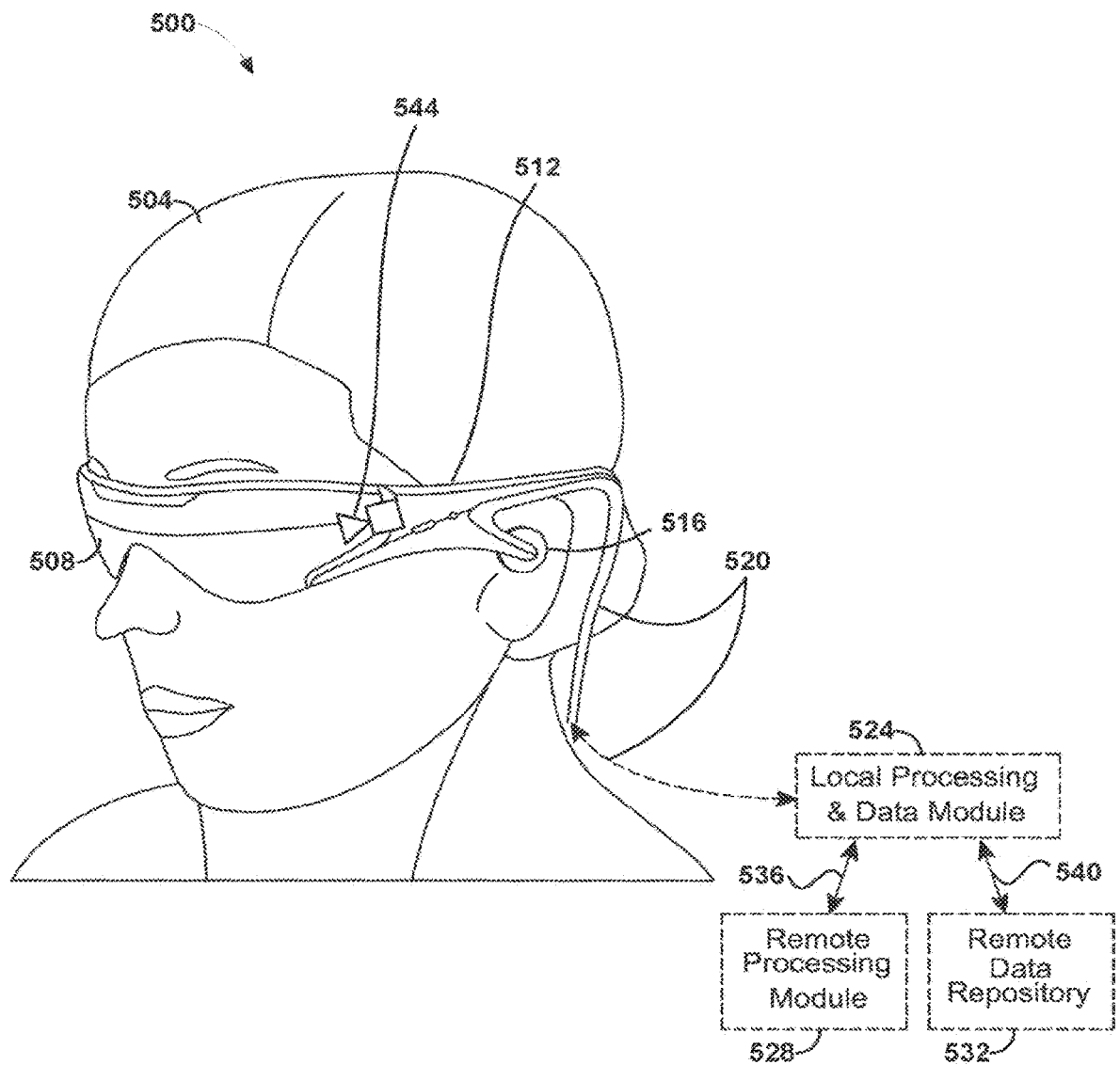
FIG. 5 schematically illustrates an example of a wearable display system, which can implement an embodiment of a neural network trained with GREAT.

FIG. 5 illustrates an example of a wearable display system 500 that can be used to present a VR, AR, or MR experience to a display system wearer or viewer 504. The wearable display system 500 may be programmed to perform any of the applications or embodiments described herein (e.g., executing CNNs, reordering values of input activation maps or kernels, eye image segmentation, or eye tracking). The display system 500 includes a display 508, and various mechanical and electronic modules and systems to support the functioning of that display 508. The display 508 may be coupled to a frame 512, which is wearable by the display system wearer or viewer 504 and which is configured to position the display 508 in front of the eyes of the wearer 504. The display 508 may be a light field display. In some embodiments, a speaker 516 is coupled to the frame 512 and positioned adjacent the car canal of the user in some embodiments, another speaker, not shown, is positioned adjacent the other ear canal of the user to provide for stereo/shapeable sound control. The display system 500 can include an outward-facing imaging system 544 (e.g., one or more cameras) that can obtain images (e.g., still images or video) of the environment around the wearer 504. Images obtained by the outward-facing imaging system 544 can be analyzed by embodiments of a neural network trained by the method 400 described with reference to FIG. 4. For example, images of the environment can be analyzed by a multitask network trained via GREAT for multiple computer vision tasks.

In some implementations, an initial neural network trained via GREAT is implemented by the display system 500 (e.g., the network is performed by processing modules 524 or 536). As the user utilizes the display system 500, the system 500 can accumulate user-specific data (e.g., images of the user's environment). The initial neural network can be re-trained (e.g., using GREAT) using the user-specific data, which advantageously can customize the neural network to the personal traits and environment of the user. The re-training can be offloaded to the cloud (e.g., the remote processing module 528) and then the re-trained network stored at least partially in the local data module 524. In other cases, the re-training may be performed locally (e.g., via the local processing and data module 524), for example, during down times when the user is not actively using the display system 500.

The display 508 is operatively coupled 520, such as by a wired lead or wireless connectivity, to a local data processing module 524 which may be mounted in a variety of configurations, such as fixedly attached to the frame 512, fixedly attached to a helmet or hat worn by the user, embedded in headphones, or otherwise removably attached to the user 504 (e.g., in a backpack-style configuration, in a belt-coupling style configuration).

The local processing and data module 524 may comprise a hardware processor, as well as non-transitory digital memory, such as non-volatile memory e.g., flash memory, both of which may be utilized to assist in the processing, caching, and storage of data. The data include data (a) captured from sensors (which may be, e.g., operatively coupled to the frame 512 or otherwise attached to the wearer 504), such as image capture devices (such as cameras), microphones, inertial measurement units, accelerometers, compasses, GPS units, radio devices, and/or gyros; and/or (b) acquired and/or processed using remote processing module 528 and/or remote data repository 532, possibly for passage to the display 508 after such processing or retrieval. The local processing and data module 524 may be operatively coupled to the remote processing module 528 and remote data repository 532 by communication links 536, 540, such as via a wired or wireless communication links, such that these remote modules 528, 532 are operatively coupled to each other and available as resources to the local processing and data module 524. The image capture device(s) can be used to capture the eye images used in the eye image segmentation, or eye tracking procedures.

In some embodiments, the remote processing module 528 may comprise one or more processors configured to analyze and process data and/or image information such as video information captured by an image capture device. The video data may be stored locally in the local processing and data module 524 and/or in the remote data repository 532. In some embodiments, the remote data repository 532 may comprise a digital data storage facility, which may be available through the internet or other networking configuration in a "cloud" resource configuration. In some embodiments, all data is stored and all computations are performed in the local processing and data module 524, allowing fully autonomous use from a remote module.

In some implementations, the local processing and data module 524 and/or the remote processing module 528 are programmed to perform embodiments of the neural networks disclosed herein. For example, the local processing and data module 524 and/or the remote processing module 528 can be programmed to perform embodiments of task predictions and determinations, knowledge distillation, multitask learning, or adversarial defense using a neural network trained using an embodiment of the GREAT method 400 described with reference to FIG. 4. The image capture device can capture video for a particular application (e.g., augmented reality (AR), human-computer interaction (HCI), autonomous vehicles, drones, or robotics in general). The video can be analyzed using an NN by one or both of the processing modules 524, 528. In some cases, off-loading at least some of the training or neural network modules to a remote processing module (e.g., in the "cloud") may improve efficiency or speed of the computations. The parameters of the CNN (e.g., weights, bias terms, subsampling factors for pooling layers, number and size of kernels in different layers, number of feature maps, etc.) can be stored in data modules 524 and/or 532.

The results of task predictions or determinations (e.g., the output of the multitask network 400 described with reference to FIG. 4) can be used by one or both of the processing modules 524, 528 for additional operations or processing. For example, the processing modules 524, 528 of the wearable display system 500 can be programmed to perform additional applications (such as applications in augmented reality, human-computer interaction (HCI), autonomous vehicles, drones, or robotics in general) based on the output of a neural network trained via GREAT.

Additional Tasks

Embodiments of GREAT are not limited to training neural networks for computer vision tasks, where the neural network is trained on images or visual data. In other embodiments, the training data can include non-image data captured by sensors, such as audio data, acceleration data, positioning data, temperature data, radio frequency data, or optical tracking data. Examples of sensors include audio sensors (e.g., microphones), inertial measurement units (IMUs), accelerometers, compasses, gyroscopes, temperature sensors, movement sensors, depth sensors, global positioning system (GPS) units, and radio devices. In other embodiments, the training sample for medical-related tasks can include measurements, such as gender, age, heart rate, body temperature, white cell count, disease state, disease progression, symptoms, disease diagnosis, etc.

For example, for tasks relating to speech recognition or natural language processing, the training sample can include audio data sets (or audio data that accompanies a video) or electronic representations or embeddings (e.g., n-grams) of words, sentences, paragraphs, or texts. Tasks can include, for example, part-of-speech (POS) tagging, chunking dependency parsing, semantic relatedness, or textual entailment.

Tasks can be related to medical treatment or medical decision making. For example, tasks can include determination of which laboratory tests should be performed on or a risk assessment for a patient who might have a particular disease. As such an example, training data can include measurements (e.g., gender, age, heart rate, body temperature, white cell count, etc.) of patients with a particular disease or symptom (e.g., pneumonia). Embodiments of GREAT can be used to train a neural network for predicting disease risk assessment or laboratory tests for a patient.

Thus the training data used by GREAT can include images, video, audio, electronic records, databases, etc., which may be associated with a respective training label, classification or signal.

Additional Aspects

1. A system for training a neural network, the system comprising: non-transitory memory configured to store: executable instructions; a main neural network configured to determine an output associated with a task; and an auxiliary neural network configured to train a gradient tensor associated with the main neural network; and a hardware processor in communication with the non-transitory memory, the hardware processor programmed by the executable instructions to: receive, by the main neural network, training data associated with the task to be performed by the main neural network; evaluate a gradient tensor during backpropagation in the main neural network; receive, by the auxiliary neural network, the gradient tensor; train the auxiliary neural network using an auxiliary loss function; provide to the main neural network, by the auxiliary neural network, an adversarial gradient signal; update weights in the main neural network based at least in part on the gradient tensor and the adversarial gradient signal; and output a trained main network.
2. The system of aspect 1, wherein the training data comprises images, and the task comprises a computer vision task.
3. The system of aspect 1 or aspect 2, wherein the main neural network comprises a multitask network, a knowledge distillation network, or an adversarial defense network.
4. The system of any one of aspects 1 to 3, wherein to evaluate the gradient tensor, the hardware processor is programmed by the executable instructions to evaluate a gradient of a main loss function with respect to a weight tensor in each layer of the main neural network.
5. The system of any one of aspects 1 to 4, wherein to provide to the main neural network the adversarial gradient signal, the hardware processor is programmed to utilize gradient reversal.
6. The system of any one of aspects 1 to 5, wherein to provide to the main neural network the adversarial gradient signal, the hardware processor is programmed to determine a signal for a layer in the main neural network that is based at least partly on weights in preceding layers of the main neural network.
7. The system of any one of aspects 1 to 6, wherein to update weights in the main neural network, the hardware processor is programmed to regularize the weights in the main neural network based at least in part on the adversarial gradient signal.
8. The system of any one of aspects 1 to 7, wherein the main neural network comprises a multitask network, the task comprises a plurality of tasks, and the multitask network comprises: a shared encoder; a plurality of task-specific decoders associated with a respective task from the plurality of tasks; and a plurality of gradient-alignment layers (GALs), each GAL of the plurality of GALs located after the shared encoder and before at least one of the task-specific decoders.
9. The system of aspect 8, wherein the hardware processor is programmed to train each GAL of the plurality of GALs using a reversed gradient signal from the auxiliary neural network.
10. The system of aspect 8 or aspect 9, wherein the hardware processor is programmed to train each GAL of the plurality of GALs to make statistical distributions of the gradient tensors for each of the plurality of tasks indistinguishable.
11. The system of any one of aspects 8 to 10, wherein the plurality of GALs are dropped during forward inference in the multitask network.
12. The system of any one of aspects 1 to 11, wherein the main neural network comprises a knowledge distillation network that comprises a student network and a teacher network, and the auxiliary loss function comprises a binary classifier trainable to discriminate between (1) a gradient tensor of the student network and (2) a gradient tensor of the teacher network.
13. The system of aspect 12, wherein the hardware processor is programmed to train the auxiliary network to drive a statistical distribution of the gradient tensor of the student network to be similar to a statistical distribution of the gradient tensor of the teacher network.
14. The system of any one of aspects 1 to 13, wherein the main neural network comprises a neural network configured to analyze images, and the hardware processor is programmed to utilize a modified cross-entropy loss function in which a cross-entropy loss of the main neural network is modified based at least in part on a soft-max function evaluated on an output activation from the auxiliary neural network.
15. The system of any one of aspects 1 to 14, wherein the main neural network comprises a neural network configured to analyze images, and the hardware processor is programmed to utilize a modified cross-entropy loss function configured to add weight to negative classes whose gradient tensors are similar to gradient tensors of a primary class.
16. A method for training a neural network comprising a main neural network configured to determine an output associated with a task and an auxiliary neural network configured to train a gradient tensor associated with the main neural network, the method comprising: receiving, by the main neural network, training data associated with the task to be performed by the main neural network; evaluating a gradient tensor during backpropagation in the main neural network; receiving, by the auxiliary neural network, the gradient tensor; training the auxiliary neural network using an auxiliary loss function; providing to the main neural network, by the auxiliary neural network, an adversarial gradient signal; updating weights in the main neural network based at least in part on the gradient tensor and the adversarial gradient signal; and outputting a trained main network.
17. The method of aspect 16, wherein the training data comprises images, and the task comprises a computer vision task.
18. The method of aspect 16 or aspect 17, wherein the main neural network comprises a multitask network, a knowledge distillation network, or an adversarial defense network.
19. The method of any one of aspects 16 to 18, wherein evaluating the gradient tensor comprises evaluating a gradient of a main loss function with respect to a weight tensor in each layer of the main neural network.

20. The method of any one of aspects 16 to 19, wherein providing the adversarial gradient signal to the main neural network comprises utilizing gradient reversal.

21. The method of any one of aspects 16 to 20, wherein providing the adversarial gradient signal comprises determining a signal for a layer in the main neural network that is based at least partly on weights in preceding layers of the main neural network.

22. The method of any one of aspects 16 to 21, wherein updating the weights in the main neural network comprises regularizing the weights in the main neural network based at least in part on the adversarial gradient signal.

23. A head mounted display system comprising: non-transitory memory configured to store: executable instructions, and a neural network for determining a task output associated with the head mounted display system, wherein the neural network is trained using: an auxiliary network programmed to receive gradient tensors evaluated during backpropagation of the neural network and to generate an adversarial gradient signal, wherein weights of the neural network are updated using the adversarial gradient signal from the auxiliary network; a display; a sensor; and a hardware processor in communication with the non-transitory memory and the display, the hardware processor programmed by the executable instructions to: receive a sensor datum captured by the sensor; determine a task output using the neural network with the sensor datum as input; and cause the display to show information related to the determined task output to a user of the head mounted display system.

24. The system of aspect 23, wherein the sensor comprises an outward-facing camera and the task comprises a computer vision task.

25. The system of aspect 24, wherein the computer vision task comprises one or more of face recognition, visual search, gesture identification, room layout estimation, cuboid detection, semantic segmentation, object detection, lighting detection, simultaneous localization and mapping, or relocalization.

Additional Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time. As another example, training a neural network using embodiments of the GREAT methods described herein are computationally challenging and can be implemented on graphical processing units (GPUs), application specific integrated circuits (ASICs), or floating point gate arrays (FPGAs).

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described herein may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A head mounted display system comprising:
   non-transitory memory configured to store executable instructions, and a neural network that determines a task output associated with the head mounted display system,
   wherein the neural network is trained using an auxiliary neural network trained by an auxiliary loss function programmed to receive gradient tensors evaluated during backpropagation of the neural network and to generate an adversarial gradient signal, and
   wherein weights of the neural network are updated using the adversarial gradient signal from the auxiliary neural network;
   a display;
   a sensor; and
   a hardware processor in communication with the non-transitory memory and the display, the hardware processor programmed by the executable instructions to:
   receive a sensor datum captured by the sensor;
   determine the task output using the neural network with the sensor datum as input;
   cause the display to show information related to a task of the task output to a user of the head mounted display system;
   perform an analysis of the information using the neural network trained by the auxiliary neural network trained by the auxiliary loss function; and
   perform the task based on the analysis and the neural network trained by the auxiliary neural network trained by the auxiliary loss function.

2. The system of claim 1, wherein the sensor comprises an outward-facing camera and the task comprises a computer vision task.

3. The system of claim 2, wherein the computer vision task comprises one or more of face recognition, visual search, gesture identification, room layout estimation, cuboid detection, semantic segmentation, object detection, lighting detection, simultaneous localization and mapping, or relocalization.

4. The system of claim 1, wherein the neural network comprises a multitask network, a knowledge distillation network, or an adversarial defense network.

5. The system of claim 1, wherein a gradient of a main loss function with respect to a weight tensor in each layer of the neural network is evaluated for each of the gradient tensors.

6. The system of claim 1, wherein a gradient tensor in the auxiliary neural network is processed and the adversarial gradient signal is passed back to the neural network via a gradient reversal procedure.

7. The system of claim 1, wherein a signal for a layer in the neural network that is based at least partly on weights in preceding layers of the neural network is determined to provide the neural network the adversarial gradient signal.

8. The system of claim 1, wherein the weights are updated to regularize the weights in the neural network based at least in part on the adversarial gradient signal.

9. The system of claim 1, wherein the neural network comprises a multitask network, the task comprises a plurality of tasks, and the multitask network comprises:
 a shared encoder;
 a plurality of task-specific decoders associated with a respective task from the plurality of tasks; and
 a plurality of gradient-alignment layers (GALs), each GAL of the plurality of GALs located after the shared encoder and before at least one of the task-specific decoders.

10. The system of claim 9, wherein each GAL of the plurality of GALs is trained using a reversed gradient signal from the auxiliary neural network.

11. A method in a head mounted display system, the method comprising:
 storing executable instructions, and a neural network that determines a task output associated with the head mounted display system,
 wherein the neural network is trained using an auxiliary neural network trained by an auxiliary loss function programmed to receive gradient tensors evaluated during backpropagation of the neural network and to generate an adversarial gradient signal, and
 wherein weights of the neural network are updated using the adversarial gradient signal from the auxiliary neural network;
 receiving a sensor datum captured by a sensor of the head mounted display system;
 determining the task output using the neural network with the sensor datum as input;
 causing a display of the head mounted display system to show information related to a task of the task output to a user of the head mounted display system;
 analyzing the information using the neural network trained by the auxiliary neural network trained by the auxiliary loss function; and
 performing the task based on the analyzing and the neural network trained by the auxiliary neural network trained by the auxiliary loss function.

12. The method of claim 11, wherein the sensor comprises an outward-facing camera and the task comprises a computer vision task.

13. The method of claim 12, wherein the computer vision task comprises one or more of face recognition, visual search, gesture identification, room layout estimation, cuboid detection, semantic segmentation, object detection, lighting detection, simultaneous localization and mapping, or relocalization.

14. The method of claim 11, wherein the neural network comprises a multitask network, a knowledge distillation network, or an adversarial defense network.

15. The method of claim 11, wherein a gradient of a main loss function with respect to a weight tensor in each layer of the neural network is evaluated for each of the gradient tensors.

16. The method of claim 11, wherein a gradient tensor in the auxiliary neural network is processed and the adversarial gradient signal is passed back to the neural network via a gradient reversal procedure.

17. The method of claim 11, wherein a signal for a layer in the neural network that is based at least partly on weights in preceding layers of the neural network is determined to provide the neural network the adversarial gradient signal.

18. The method of claim 11, wherein the weights are updated to regularize the weights in the neural network based at least in part on the adversarial gradient signal.

19. The method of claim 11, wherein the neural network comprises a multitask network, the task comprises a plurality of tasks, and the multitask network comprises:
 a shared encoder;
 a plurality of task-specific decoders associated with a respective task from the plurality of tasks; and
 a plurality of gradient-alignment layers (GALs), each GAL of the plurality of GALs located after the shared encoder and before at least one of the task-specific decoders.

20. The method of claim 19, wherein each GAL of the plurality of GALs is trained using a reversed gradient signal from the auxiliary neural network.

* * * * *